United States Patent [19]
Kolb

[11] 3,711,890
[45] Jan. 23, 1973

[54] WINDSHIELD WIPER

[75] Inventor: Erich Kolb, Eisental, Germany

[73] Assignee: Robert Bosch GmbH, Stuttgart, Germany

[22] Filed: Oct. 8, 1971

[21] Appl. No.: 187,758

[30] Foreign Application Priority Data

Oct. 9, 1970   Germany ................... G 70 37 380.7

[52] U.S. Cl. ............................................. 15/250.34
[51] Int. Cl. ............................................. B60A 1/04
[58] Field of Search ......... 15/250.34, 250.35, 250.42, 15/250.31

[56] References Cited

UNITED STATES PATENTS

| | | |
|---|---|---|
| 2,043,218 | 6/1936 | Anderson ............... 15/250.34 X |
| 2,715,238 | 8/1955 | Krohm ............... 15/250.34 |
| 2,964,775 | 12/1960 | Krohm ............... 15/250.34 |
| 3,056,990 | 10/1962 | Ryck ............... 15/250.34 |

*Primary Examiner*—Peter Feldman
*Attorney*—Michael S. Striker

[57] ABSTRACT

A windshield wiper has a drive shaft provided with a shoulder and a hub which removably surrounds the drive shaft coaxially therewith. An arm has one end articulated to the hub and an other end to which a wiper blade is connected. A latching element is provided on the hub pivotable about an axis which generally parallels that of the drive shaft and is movable between a first and a second position respectively engaging and withdrawn from the shoulder of the latter. A tension spring has its opposite ends connected to the latching element and to the arm, normally urging the latching element into its first position engaging the shoulder of the drive shaft.

10 Claims, 6 Drawing Figures

WINDSHIELD WIPER

BACKGROUND OF THE INVENTION

The present invention relates generally to a windshield wiper, and more particularly to an improved windshield wiper construction for use on vehicles, particularly but not exclusively automotive vehicles.

Generally speaking, windshield wipers for vehicles utilize a drive shaft on which a hub is removably mounted, the hub carrying an arm on the free end of which the wiper blade is secured. A latching element releasably retains the hub on the drive shaft.

In one prior-art construction of such a windshield wiper, the latching element is mounted on a bolt on the hub, the bolt extending transversely to the bore in the hub into which the drive shaft extends. When the arm carrying the blade is pivoted away from the windshield, for instance for cleaning the windshield or for inspection of the arm, the tension spring which is connected at one end with the arm and at the other end with the latching element disengages the latter from its latching position, so that without any further manipulations the entire arrangement can be withdrawn from the drive shaft, that is the hub can be pulled off the drive shaft. Of course, there are many instances when this disconnection is not desired but when the arm must be pivoted away from the windshield, for instance when the windshield is to be cleaned. To avoid under such circumstances the undesired separation of the hub from the drive shaft, an additional arresting spring is provided in this prior-art construction which engages behind an annular shoulder on the drive shaft—as does the latching element—and whose retaining action must be overcome after the latching element is disengaged and before the hub can be removed from the drive shaft. The same is true, of course, when the hub is to be re-connected to the drive shaft. This prior-art construction is relatively complicated and therefore more expensive than necessary, aside from the fact that it has the disadvantage that a rather large number of components must be accommodated in a rather small available space requiring that the various parts be manufactured to uneconomical precise tolerances.

SUMMARY OF THE INVENTION

It is, accordingly, an object of the present invention to provide an improved windshield wiper construction which is not possessed of the disadvantages of the prior art.

More particularly it is an object of the present invention to provide an improved windshield wiper in which both the construction and the manner in which the wiper is connected to and disconnected from the drive shaft, are simplified over what is known from the art.

A further object of the invention is to provide such a construction in which the various components need not be made to very precise tolerances.

In pursuance of the above objects, and of others which will become apparent hereafter, one feature of the invention resides in a windshield wiper which, briefly stated, comprises a drive shaft having a shoulder and a hub which removably surrounds the drive shaft coaxially therewith. An arm has one end articulated to the hub, and an other end to which a wiper blade is connected. A latching element is provided on the hub and pivotable about an axis which at least substantially parallels that of the drive shaft, being movable between a first and a second position in which it respectively engages and is withdrawn from the shoulder of the drive shaft. A tension spring has two spaced ends which are respectively connected to the arm and the latching element and which permanently urge the latter to its first position.

The latching element has an arm which extends transversely to the axis of the drive shaft and to that of the bore in the hub which accommodates the drive shaft, and when the wiper arm is pivoted away from the windshield with this construction, the latching element will remain in its latching position—contrary to the teachings of the prior art—so that the hub will remain reliably and safely connected to its associated drive shaft without requiring any separate means for this purpose.

It is advantageous to have the projection or arm of the latching element be springy, that is elastically yieldable and to have its free end preferably configurated as a handle for manual engagement. This facilitates displacement of the latching element to its second position in which it disengages the shoulder of the drive shaft.

A particularly simple embodiment of the invention is obtained if the latching element is journalled in a pin which extends in parallelism with the bore of the hub and is provided with a hole in which a hook-shaped end portion of the tension spring can be engaged. The pivot axis of the latching element may also advantageously be laterally offset with respect to a plane passing through the longitudinal axis of the tension spring and the axis of the bore in the hub. With such a construction the force exerted by the tension spring acts as an additional safety factor because it is transmitted to the latching element in a sense tending to pivot the latter about the pin extending in parallelism with the bore of the hub and to press the arm of the latching element behind the shoulder of the drive shaft against the circumference of the latter. When the wiper arm is pivoted away from the windshield this additional force is reduced but not entirely raised, and under no circumstance will the latching engagement between hub and drive shaft—preventing undesired separation of the two—be disconnected. On the other hand, when it is desired to positively disconnect the hub from the drive shaft, the arm of the latching element can be easily and without requiring any tool moved to its second or disengaged position.

The springy arm of the latching element may advantageously be so configurated that it embraces the drive shaft through a portion of arc of approximately 180° and laterally projects outwardly beyond the hub with its free end portion. In such a construction the arm of the latching element will contact the circumference of the drive shaft over a relatively large portion of the circumference of the latter, so that forcible withdrawal of the hub from the drive shaft is—with the latching element in its latching position—is not possible. Also, with such a construction the arm of the latching element can be readily pivoted out of its latching position because its free end portion constitutes a handle which can be readily grasped.

It is also advantageous to have the thickness of the arm of the latching element taper at the side which faces radially outwardly away from the axis of the hub, whereby it can readily snap behind the shoulder—preferably an annular shoulder—on the drive shaft when the hub is placed about the latter. The latching element preferably, but not necessarily, may consist of a resiliently yieldable synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
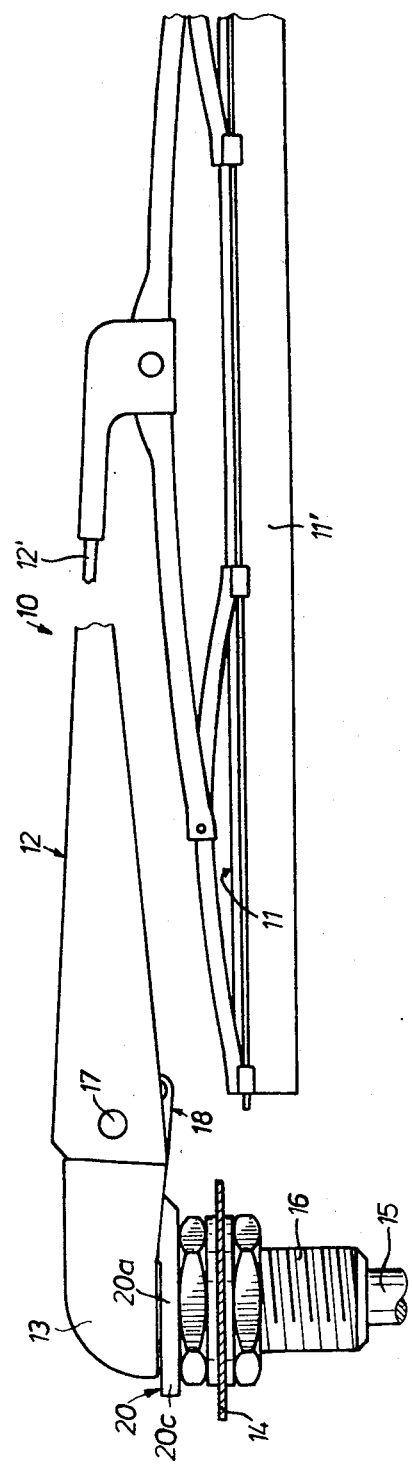
FIG. 1 is a side view of a windshield wiper according to the present invention provided on its drive shaft.
Figure 2:
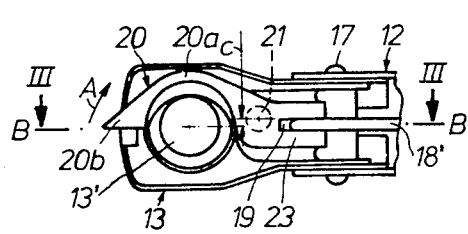
FIG. 2 is a bottom view of the hub of the windshield wiper in FIG. 1, with the latter detached from the drive shaft.
Figure 3:
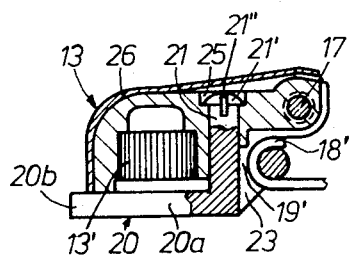
FIG. 3 is a longitudinal section through the hub of FIG. 2, with the latching element partially sectioned in perspective.

Discussing firstly the embodiment in FIGS. 1–3, it will be seen that the windshield wiper illustrated therein is generally identified with reference numeral 10 and has a wiper blade 11 and a wiper arm 12 composed of an elongated rod 12' and a hub 13. The hub 13 is pushed over an end portion of a drive shaft 15 which projects out of a vehicle body 14 which is shown in part. The drive shaft 15 is journalled in a bearing secured to the vehicle body.

As the drawing shows, the rod 12' and the hub 13 are articulately connected with one another by a bolt 17, and one end of a tension spring 18 is connected to the rod 12'. The other end of the tension spring 18 is configurated as a hook portion 18' and engaged—and preferably soldered into—in a hole 19 provided in a latching element 20. The spring 18 is pre-tensioned and permanently tends to pivot the rod 12' about the bolt 17 so that the wiper blade 11 is pressed against the windshield to be wiped (not shown) with requisite force.

The latching element 20 according to the invention is a double-armed lever having a pin 21 which is guided in a bore provided in the hub and extending in parallelism with the axis of the main bore 13' of the hub in which the end portion of the drive shaft 15 is normally inserted. The latching element 20 has two arms, namely the arm 20a and the arm 23. The arm 20a projects in sickle-shaped configuration from the pin 21 approximately along the bore 13'; it is a resiliently yieldable arm, that is an arm which is springy. The free end portion 20b of the arm 20a projects beneath and laterally of the hub 13 as shown in FIG. 3 and is pivotable about the pin 21 in a plane extending transversely to the bore 13' of the hub.

The upper arm 23 of the latching element 20 is provided with the hole 13 in which the hook portion 18' of the spring 18 is engaged, and it extends substantially in opposite direction to the arm 20a.

The bore in which the pin 21 is received is located between the bore 13' and the bolt 17 in the hub 13, and it will be seen that the pin 21 is longer than the bore in which it is received and is provided at its free end with a head 21' which is located in a depression 25 of the hub 13 adjacent to the bore for the pin, whereby the latching element 20 cannot be accidentally disconnected from the hub 13. The head 21' is provided with a slot 21" to permit insertion of the pin 21 into the associated bore by compressing the head 21' to such an extent that it can be inserted into the bore. In the region of the depression 25 the head 21' will again expand to its original configuration so that the latching element 20 is held in the bore against displacement in axial direction. It will be seen that the slot 21" is preferably configurated as a crossed slot.

It is advantageous and illustrated in FIG. 2 that the pin 21 be located laterally of the plane B—B passing through the axis of the spring 18 and the axis of the bore 13', by a distance C. With respect to this plane B—B the pin 21 is located at the same side as the arm 20a. A cap 26 is provided on the hub 13 which covers the depression 25 with the head 21' with respect to the exterior.

When the hub 13 is to be placed onto the drive shaft 15 the arm 20a is displaced in the direction of the arrow A (see FIG. 2) by pulling or pushing against its end portion 20', pivoting it about the axis of the pin 21 and if necessary against its springing tendency. The arm 20a is thus displaced until it is free of the bore 13' cross-section. When the hub 13 is pushed onto the drive shaft 15 to requisite position the arm 20a is released whereupon it will springily return to its original position and will engage behind a shoulder—preferably an annular shoulder—15' of the shaft 15, which has been illustrated only once, namely in FIG. 6. The tension of the spring 18 additionally exerts upon the latching element 20 a moment of force which is counter to the arrow A and which exerts an additional force against the arm 20a in a sense maintaining it in engagement with the circumference of the drive shaft 15 behind the shoulder 15' thereof.

Figure 4:
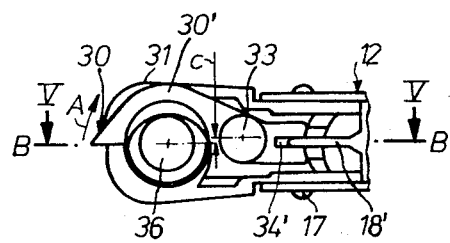
FIG. 4 is a bottom view of the hub according to another embodiment of the invention.
Figure 5:
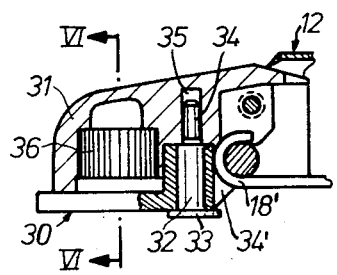
FIG. 5 is a longitudinal section of the hub in FIG. 4, with the latching element partially in perspective.
Figure 6:
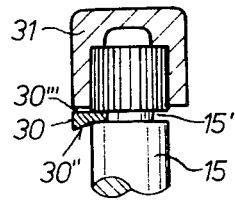
FIG. 6 is a section taken on line VI—VI of FIG. 5.

The embodiment in FIGS. 4–6 corresponds largely to that of FIGS. 1–3, and like reference numerals have been used to some extent for like elements. In this embodiment, however, the latching element is identified with reference numeral 30 and is turnably journalled on a pin 32 which is fixedly connected with the hub 31. The pin 32 projects slightly beyond the latching element 30 and has a head 33 which retains the latching element 30 engaged with the pin 32. The latter is fixedly pressed into a bore 35 of the hub 31 by means of an extension 34. As in the preceding embodiment, the axis of the pin 32 is located laterally of a plate B—B corresponding to the one discussed in the embodiment of FIGS. 1–3 and passing through the axis of the spring 18, through a hole 34' and the bore 36 of the hub 31.

The latching element 30 has a springy or resiliently deflectable arm 30' which, to permit it to snap readily behind the annular shoulder 15' of the drive shaft 15 when the hub is placed onto the latter, is inclined (see FIG. 6) or tapered at its side 30" facing away from the hub. The side 30'' of the arm 30', which abuts against an end face of the annular shoulder 15' at right angle to the axis of the shaft 15, thus serves to retain the hub 31 on the shaft 15.

Aside from overcoming the disadvantages of the prior art which were outlined in the introductory portion of the specification, a further advantage of the present invention is in the fact that the construction thereof is very simple and that the windshield wiper can be connected with and disconnected from the drive shaft without the aid of any tools whatsoever, a consideration which in certain circumstances may become very important to the vehicle operator and passengers.

It will be understood that each of the elements described above, or two or more together, may also find a useful application in other types of constructions differing from the types described above.

While the invention has been illustrated and described as embodied in a windshield wiper, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a windshield wiper, in combination, a drive shaft having a shoulder; a hub removably surrounding said drive shaft coaxial therewith; an arm having one end articulated to said hub, and an other end; a wiper blade connected to said other end; a latching element on said hub and pivotable about an axis at least substantially paralleling that of said drive shaft between a first and a second position in which it respectively engages and is withdrawn from said shoulder; and a tension spring having two spaced ends respectively connected to said arm and said latching element and permanently urging the latter to said first position.

2. In a windshield wiper as defined in claim 1, said latching element having a portion extending and movable transversely to said axis into and out of engagement with said shoulder.

3. In a windshield wiper as defined in claim 2, said portion being elastically yieldable.

4. In a windshield wiper as defined in claim 3, said portion having a free end configured as a handle for manual engagement.

5. In a windshield wiper as defined in claim 2, said latching element comprising a pin mounted on said hub paralleling said axis of said shaft, and a latching member journalled in said pin for pivotal movement and having said portion and a hole for connection of said tension spring.

6. In a windshield wiper as defined in claim 1, said axis of said latching element being laterally offset from a plane passing through the axis of said shaft and through said tension spring longitudinally of the latter.

7. In a windshield wiper as defined in claim 2, said portion of said latching element embracing said shaft over substantially 180° of arc and having a free end which projects laterally beyond said hub.

8. In a windshield wiper as defined in claim 2, said portion having one side facing towards and an other side facing away from said hub; and wherein said other side is of a thickness which tapers in direction away from said one side.

9. In a windshield wiper as defined in claim 1, said latching element being constituted of synthetic plastic material.

10. In a windshield wiper as defined in claim 9, said synthetic plastic material being elastically yieldable.

* * * * *